United States Patent [19]

Inokuchi

[11] 4,044,384
[45] Aug. 23, 1977

[54] OPTICAL SCANNING APPARATUS

[75] Inventor: Toshiyuki Inokuchi, Tokyo, Japan

[73] Assignee: Ricoh Co., Ltd., Tokyo, Japan

[21] Appl. No.: 707,962

[22] Filed: July 23, 1976

[30] Foreign Application Priority Data

July 24, 1975 Japan .................................. 50-90542
July 31, 1975 Japan .................................. 50-93728
July 31, 1975 Japan .................................. 50-93730

[51] Int. Cl.$^2$ ........................ H04N 1/10; H04N 3/14
[52] U.S. Cl. ..................................... 358/293; 358/213
[58] Field of Search ............... 358/285, 293, 288, 294, 358/213, 92

[56] References Cited

U.S. PATENT DOCUMENTS 3,947,627  3/1976  Tanaka ................................. 358/294
3,962,681  6/1976  Requa .................................. 358/213

Primary Examiner—Howard W. Britton
Attorney, Agent, or Firm—Frank J. Jordan

[57] ABSTRACT

A scan line of an original document is divided into first and second halves, and first and second optical systems focus first and second images of the first and second halves onto a linear array of photosensitive elements such as photodiodes. The first and second images are each coextensive with the array and superimpose. A rotary shutter alternatingly blocks the first and second images so that only one of the first and second images is incident on the array at any time.

10 Claims, 24 Drawing Figures

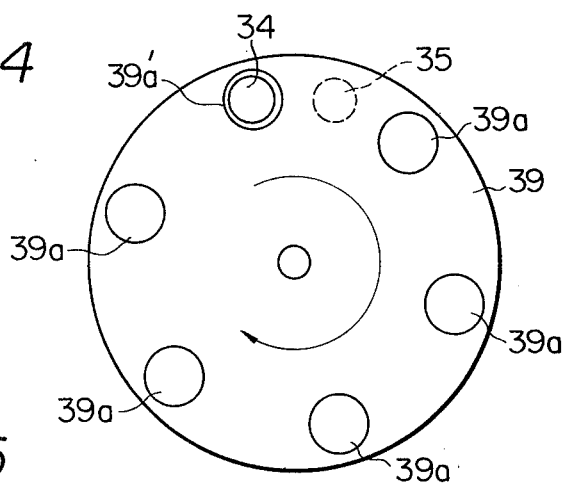
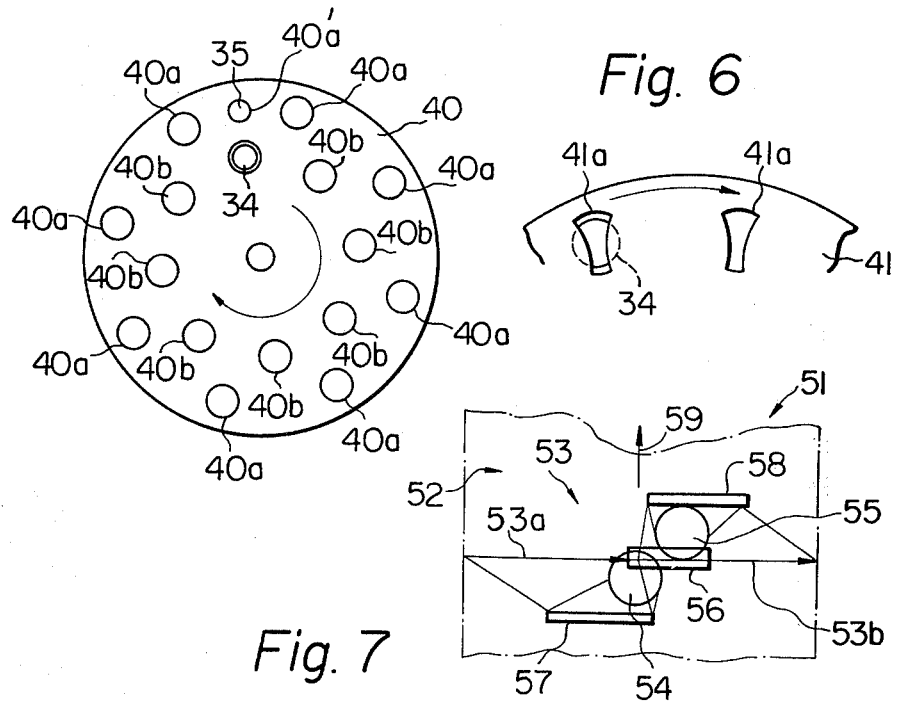

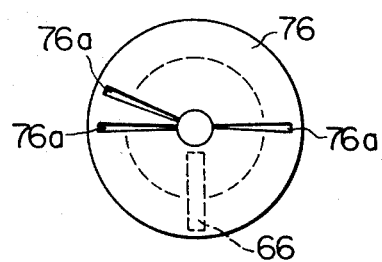
Fig. 16
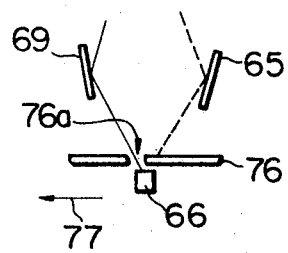
Fig. 17
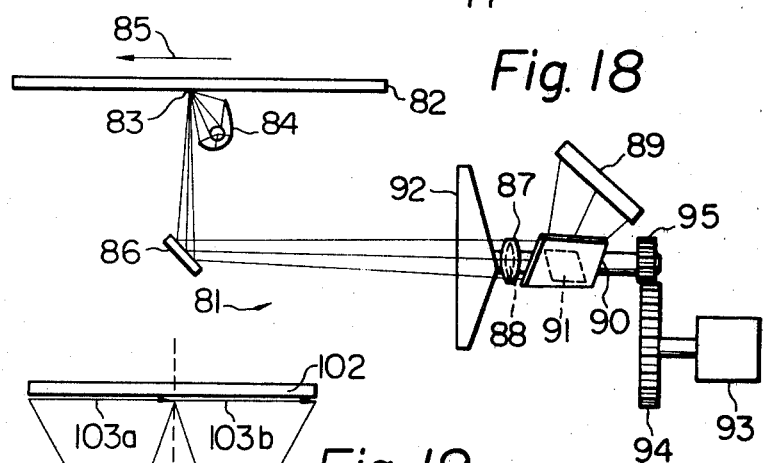
Fig. 18
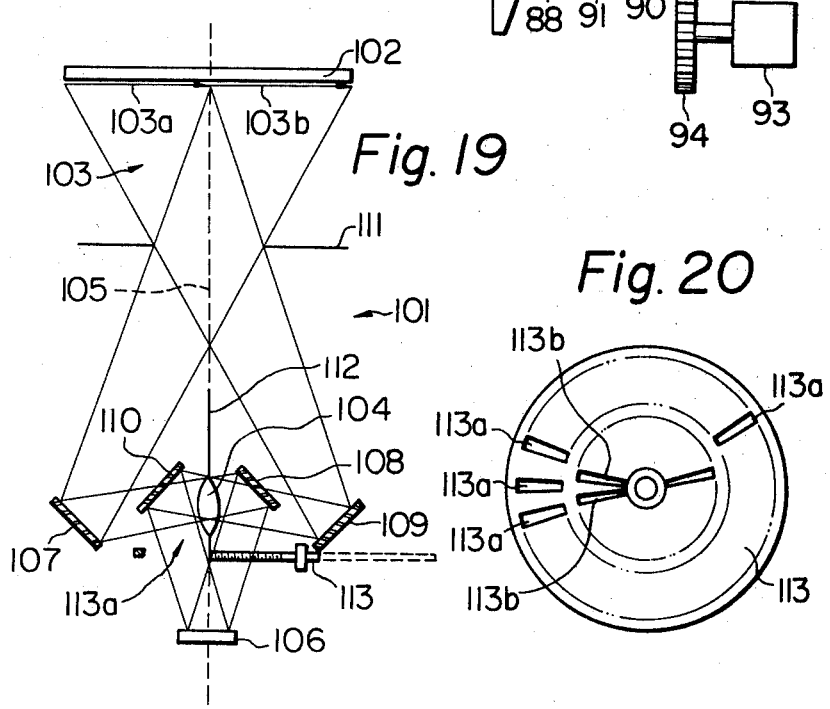
Fig. 19
Fig. 20

OPTICAL SCANNING APPARATUS

BACKGROUND OF THE INVENTION

The present invention relates to an optical scanning apparatus for a facsimile system or the like.

It is known in the art to provide an optical system to focus an optical image of a scan line of an original document for facsimile transmission or the like onto a photosensitive array comprising a large number of photosensitive elements such as photodiodes arranged in a line. In this manner, the scan line of the document is divided into a number of discrete bits corresponding to the photosensitive elements which produce respective electrical signals. The electrical signals may be transmitted and applied to a printing apparatus to reproduce the scan line. The entire document is scanned by translation perpendicular to the scan line so that images of successive scan lines of the document are sequentially focussed onto the photosensitive array.

At the present state of the art, it is possible to pack approximately 1800 photodiodes into a linear space of about 30mm. This number of bits is sufficient to provide satisfactory resolution of the width of a standard business size document, or about 8½. The focussing optical system is arranged to reduce the original scan line of the document from 8½ to 30cm.

However, such a state of the art photodiode array is quite expensive, which in some cases increases the cost of the scanning system to a prohibitive level. A prior art expedient to reduce the cost of the scanning system is to divide the scan line of the original document into two or more portions, with optical systems to focus images of the portions onto respective photosensitive arrays. The electrical signals are combined electronically to reproduce the entire scan line. The number of photosensitive elements in each array is reduced in proportion to the number of arrays provided, so that the scanning system may be implemented by two or more arrays of less elements which are lower in total cost than a single closely packed array. A commercially practical system has been implemented utilizing two arrays.

However, even photosensitive arrays comprising numbers of elements which are substantially less than the state of the art are expensive compared to optical components such as mirrors, and any number of photosensitive arrays in excess of one indicates a system which is less than optimum from the viewpoint of cost reduction.

SUMMARY OF THE INVENTION

It is an object of the present invention to provide an optical scanning apparatus for a facsimile system or the like comprising a single linear array of photosensitive elements, the system being capable of providing good resolution of an original document, the packing density of the photosensitive elements being substantially less than the state of the art such that the array is low in cost.

It is another object of the present invention to provide an optical scanning apparatus comprising a photosensitive array which is lower in manufacturing cost than any known apparatus of comparable type.

It is another object of the present invention to provide an optical scanning apparatus comprising an optical system which divides a scan line into two or more portions and focusses images of the portions each coextensively onto a photosensitive array and an optical switching means which sequentially blocks all but one of the images.

It is another object of the present invention to provide a generally improved optical scanning apparatus for a facsimile system or the like.

Other objects, together with the foregoing, are attained in the embodiments of the invention described in the following description and illustrated in the accompanying drawings.

BRIEF DESCRIPTION OF THE DRAWING

FIG. 4 is a plan view of a rotary shutter of the embodiment of FIG. 3;

FIG. 5 is a plan view of a modified rotary shutter of the embodiment of FIG. 3;

FIG. 6 is a fragmantary plan view of a further modification of the rotary shutters shown in FIGS. 4 and 5;

FIG. 7 is an overhead view of a second embodiment of an optical scanning apparatus according to the present invention;

FIG. 16 is a plan view of still another modified rotary shutter of the embodiment of FIG. 11;

FIG. 17 is a fragmentary view illustrating the operation of the rotary shutter of FIG. 16;

FIG. 18 is a side view illustrating a modified form of the embodiment of FIG. 11;

FIG. 19 is a side plan view of a fourth embodiment of an optical scanning system according to the present invention;

FIG. 20 is a plan view of a rotary shutter of the embodiment of FIG. 19;

DESCRIPTION OF THE PREFERRED EMBODIMENTS

While the optical scanning apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
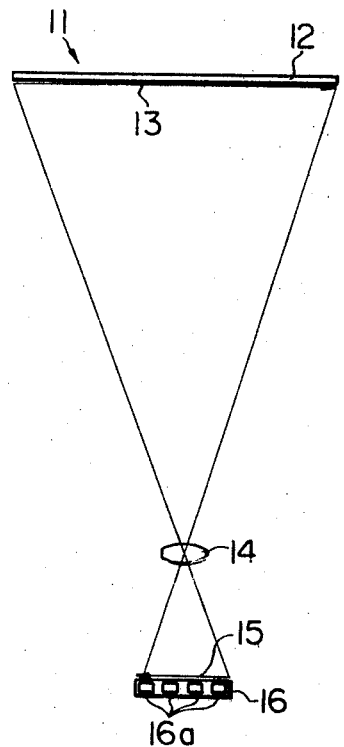
FIG. 1 is an optical diagram illustrating a prior art optical scanning apparatus comprising a single, closely packed linear array of photosensitive elements.

FIG. 1 shows a fundamental prior art optical scanning system 11. An original document 12 is disposed perpendicular to the plane of FIG. 1 and therefore is seen in section. An arrow 13 represents a thin linear portion of the document 12 which constitutes a scan line. The scan line 13 is illuminated by a light source which is not shown, and a converging lens 14 focusses an image of the scan line 13 which is represented by an arrow 15 onto a photosensitive array 16 which comprises a plurality of photosensitive elements 16a such as photodiodes. The lens 14 provides an optical reduction so that the scan line 13 which is typically 8½ long (the width of a business size letter) is focussed onto the array 16 coextensively therewith, the length of the array 16a being typically 30cm. The light source may be arranged to illuminate the entire surface of the document 12 or may illuminate only the scan line 13.

The photosensitive array 16 comprises a large number of photosensitive elements 16a, typically 1800 arranged in a straight line in order to provide satisfactory resolution of the image 15. Each photosensitive element 16a produces an electrical signal representing the intensity of the portion of the image 15 incident thereon so that the electrical signals in combination constitute a digitalized electrical representation of the scan line 13. These signals are transmitted, if the scanning apparatus 11 is utilized in a facsimile system, to a printing apparatus (not shown) at a remote location which reproduces the scan line 13 in response thereto. The entire document 12 is reproduced by translating the same perpendicular to the plane of FIG. 1 so that sucessive linear portions of the document 12 sequentially occupy the position of the scan line 13. Each time the document 12 is translated by a distance equal to the width of the scan line 13, the electrical output signals of the photosensitive elements 16a are transmitted to the printing apparatus.

The drawback of the optical scanning apparatus 11 is that the packing density of the photosensitive elements 16a must be great in order to provide satisfactory resolution, said packing density being close to the present state of the art. Such a photosensitive array 16 is necessarily quite expensive.

Figure 2:
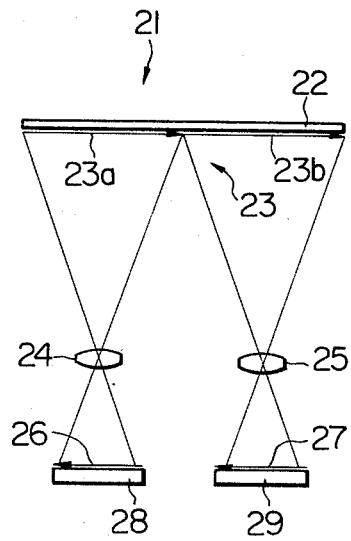
FIG. 2 is an optical diagram of an improved prior art optical scanning apparatus comprising two linear arrays of photosensitive elements, the packing density of the elements being substantially less than in the apparatus of FIG. 1.

A prior art expedient to overcome the high cost of a state of the art photosensitive array is illustrated in FIG. 2 as an optical scanning apparatus 21. A scan line 23 on an original document 22 is divided into left and right halves represented by arrows 23a and 23b respectively. Converging lenses 24 and 25 focus images of the halves 23a and 23b represented by arrows 26 and 27 coextensively onto photosensitive arrays 28 and 29 respectively similar to the array 16. However, the packing density of the arrays 28 and 29 is much less than that of the array 16. Specifically, the arrays 28 and 29 in combination provide the same resolution as the array 16 if the packing density thereof is one-half that of the array 16. The electrical signals produced by the photosensitive elements (not designated) of the arrays 28 and 29 are electronically combined to produce an electrical representation of the entire scan line 23. The operation of the apparatus 21 is otherwise identical to that of the apparatus 11.

Due to the extremely high cost of providing the closely packed array 16, the apparatus 21 is less expensive to manufacture than the apparatus 11 even though it comprises two lenses 24 and 25 and two arrays 28 and 29.

However, the apparatus 21 is still comparatively expensive to manufacture since the arrays 28 and 29, although much lower in cost than the array 16, are still high priced items, which contribute substantially to the total cost of producing the apparatus 21.

Figure 3:
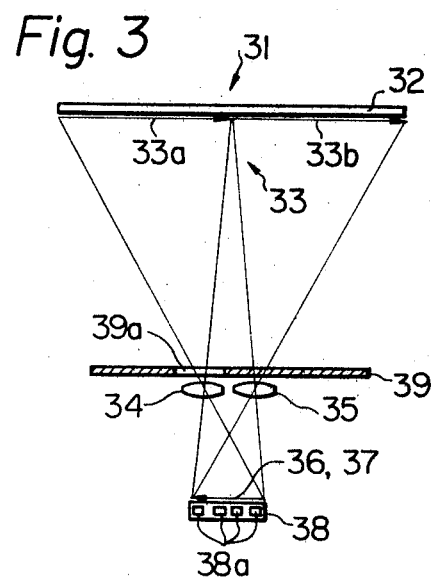
FIG. 3 is an optical diagram of a first embodiment of an optical scanning apparatus according to the present invention.

This drawback of the prior art apparatus 11 and 21 is overcome as shown in FIG. 3 by a first embodiment of an optical scanning system 31 according to the present invention. As in the prior art apparatus 21, a scan line 33 on an original document 32 is divided into first and second halves 33a and 33b. The light source for illuminating the document 32 is not shown. Converging lenses 34 and 35 focus first and second images 36 and 37 of the halves 33a and 33b onto a single photosensitive array 38 comprising a plurality of photosensitive elements 38a such as photodiodes. Differing from the apparatus 21, however, the lenses 34 and 35 are oriented in such a manner that the images 36 and 37 are each coextensive with the array 38 and are superimposed on each other. The photosensitive array 38 will provide the same resolving power as the combination of the arrays 24 and 25 of the prior art apparatus 21 if the number of photosensitive elements 38a is equal to the number of elements of one of the arrays 24 or 25.

If both of the images 36 and 37 were allowed to be incident on the array 38 at the same time, the electrical signals produced by the array 38 would represent the images 36 and 37 superimposed on each other. However, it is desired to produce signals representing the images 36 and 37 separately for recombination.

To provide this function, a rotary shutter in the form of a disc 39 is rotatably disposed between the document 32 and the lenses 34 and 35. As best seen in FIG. 4, the disc 39 is opaque and is formed with a plurality of equally circumferentially spaced openings 39a therethrough.

The purpose of the disc 39 is, upon clockwise rotation thereof, to alternatingly block the first and second images 36 and 37 so that only one of them is incident on the array 38 at any time. The openings 39a are arranged to alternatingly align with the lenses 34 and 35 so as to alternatingly allow the images 36 and 37 to propagate therethrough. As shown in FIGS. 3 and 4, one of the openings 39a which is especially designated as 39a' is aligned with the lens 34 so that the image 36 is focussed therethrough onto the array 38. The lens 35, however, is aligned with the opaque space between the opening 39a' and the adjacent opening 39a in the clockwise direction, so that the image 37 is blocked from reaching the array 38. A slight further clockwise rotation of the disc 39 will cause the opening 39a' to align with the lens 35 so that the image 37 will be focussed onto the array 38. The image 36, in this case, will be blocked.

It will be seen that the electrical signals produced by the array 38 represent alternatingly the first half 33a and the second half 33b of the scan line respectively. Although many practical systems may be employed to combine the signals, it is a simple matter to scan and transmit the left half 33a, scan and transmit the second half 33b, advance or feed the document 32 for scanning of the next linear portion thereof and repeat these operations until the entire document 32 is scanned and transmitted.

A modification of the disc 39 is illustrated in FIG. 5 as embodied by an opaque disc 40 formed with a plurality of outer openings 40a and a plurality of inner openings 40b. The outer openings 40a are arranged to align with the lens 35 whereas the openings 40b are arranged to align with the lens 34 upon clockwise rotation of the disc 40. The openings 40a are alternatingly circumferentially spaced from the openings 40b so that the lenses 35 and 34 are alternatingly unblocked. The number of openings 40a is equal to the number of openings 40b. The disc 40 therefore provides the same function as the disc 39.

FIG. 6 shows how the openings of the discs 39 or 40 may be shaped to provide what is known in the art as "shading compensation". A disc 41 is provided with openings 41a which increase in width with the radial distance from the center of the disc 41. This provides a uniform distribution of intensity of the images 36 and 37 in spite of differences in the thickness of the lenses 34 and 35 from the centers to the edges thereof and also in the increased circumferential speed of the disc 41 from the center radially outward. Shading compensation may be provided for either of the discs 39 and 40 as illustrated in FIG. 6.

Figure 8:
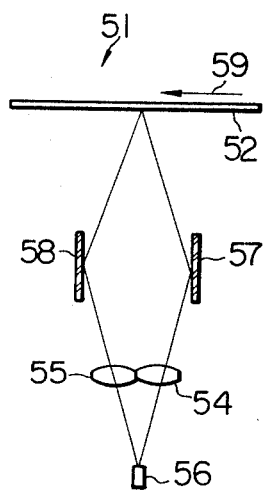
FIG. 8 is an end view of the apparatus of FIG. 7.
Figure 9:
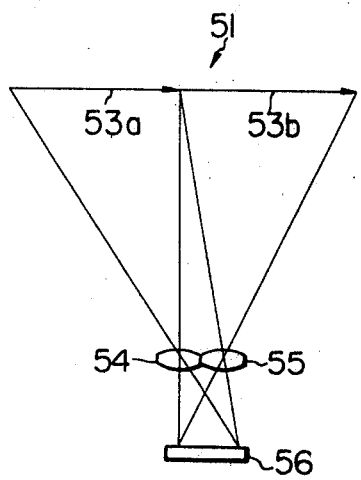
FIG. 9 is a side view of the apparatus of FIG. 7.

FIGS. 7, 8 and 9 illustrate a second embodiment of the invention, a modification of the apparatus 31, which is advantageous when utilizing a very small photosensitive array. In an optical scanning apparatus 51, a photosensitive array 56 has a length of only 1.2cm. Lenses 54 and 55 to focus images (not designated) of halves 53a and 53b of a scan line 53 of an original document 52 cannot be mounted parallel to the scan line 53 as in the apparatus 31 since the optical centers thereof would be too far apart to allow superimposition of the images of the halves 53a and 53b on the array 56. For this reason, the lenses 54 and 55 are skewed relative to the scan line 53 as shown in FIG. 7 and mirrors 57 and 58 are provided between the halves 53a and 53b and the lenses 54 and 55 respectively. The image of the half 53a is reflected from the mirror 57 through the lens 54 onto the array 56 and the image of the half 53b is reflected from the mirror 58 through the lens 55 onto the array 56. A disc such as shown in FIGS. 4 or 5 is employed to optically switch the images, although not shown, in the same manner as in the apparatus 31. An arrow 59 indicates the direction in which the document 52 is fed or translated for scanning as described above.

The mirrors 57 and 58 serve to spread out the paths of the images of the halves 53a and 53b so that the lenses 54 and 55 may focus them on the array 56 as required.

Figure 10:
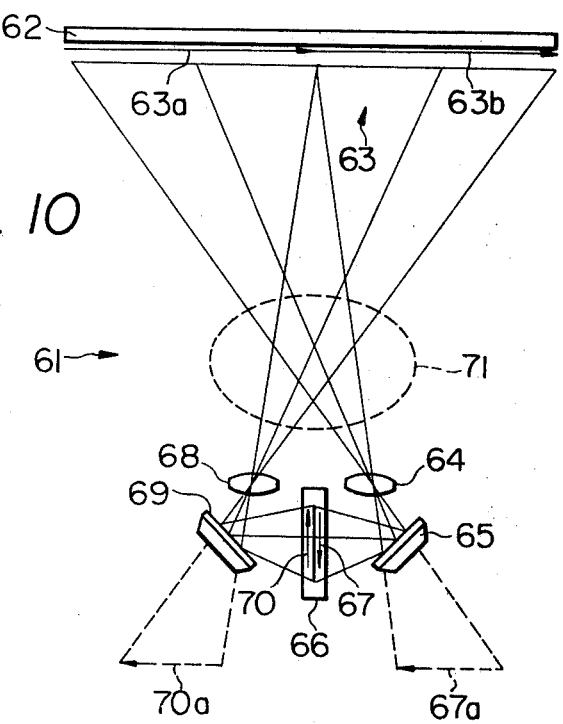
FIG. 10 is an optical diagram of a third embodiment of an optical scanning apparatus according to the present invention.

In the apparatus 31 the scan line 33, the line between the centers of the lenses 34 and 35 and the axis of the array 38 are mutually parallel. FIG. 10 illustrates a third embodiment of the invention in which the axis of an array lies in a plane perpendicular to a scan line.

An optical scanning apparatus 61 is arranged to produce electrical signals representing a scan line 63 on an original document 62. The scan line 63 is divided into halves 63a and 63b. A converging lens 64 is arranged to focus an image of the half 63a to a point represented by a phantom arrow 67a. However, a mirror 65 reflects the image onto a photosensitive array 66 at 67. In an identical manner, a mirror 69 reflects an image of the half 63b from a converging lens 68, which would otherwise focus at 70a, onto the array 66 at 70.

The axis of the photosensitive array 66 lies in a plane perpendicular to the plane of FIG. 10 and also perpendicular to the scan line 63. The plane of the axis of the array 66 intersects the scan line 63 at the junction of the halves 63a and 63b. The mirrors 65 and 69 are angled toward each other in the plane of FIG. 10 to reflect the images 67 and 70 respectively toward each other. The mirrors 65 and 69 are further angled relative to the plane of FIG. 10 to reflect the images 67 and 70 respectively downwardly as viewed from the plane of FIG. 1 so that the images 67 and 70 are superimposed on the array 66.

It will be noticed that the images of the halves 63a and 63b cross in an area designated by a phantom circle 71 and also that the images 67 and 70 are inverted relative to each other on the array 66. For this reason, a facsimile system or the like in which the apparatus 61 is incorporated comprises means such as a bi-directional shift register (not shown) to electronically invert the electrical signals representing one of the images 67 and 70 prior to recombination for transmission. If such a shift register is used, the signals representing the image 67 would be loaded thereinto and the register driven in one direction to serially shift out the signals for transmission. The signals representing the image 70 would then be loaded into the register and the register driven in the opposite direction to shift out the signals for transmission, thus performing the two operations of inversion and transmission. Another well known device for performing the same functions may comprise a random access memory sequentially addressed by an up-down counter (not shown).

Figure 11:
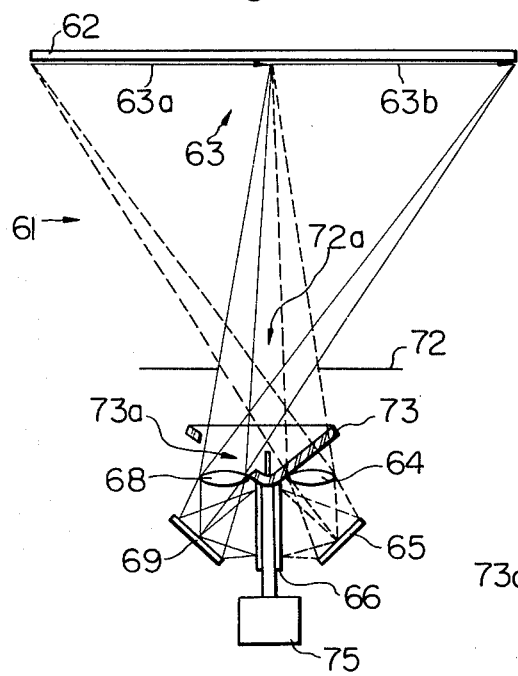
FIG. 11 is a side view, partly in section, of the apparatus of FIG. 10.
Figure 12:
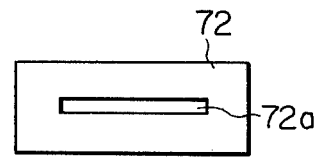
FIG. 12 is a plan view of an aperture plate or baffle of the embodiment of FIG. 11.
Figure 13:
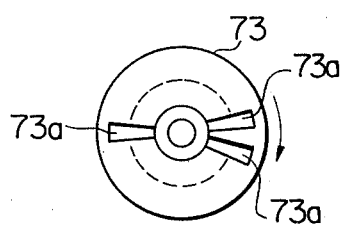
FIG. 13 is a plan view of a rotary shutter of the embodiment of FIG. 11.

FIG. 11 is a plan view of the apparatus 61. In order to eliminate flare in the area 71 where the images cross, an aperture plate or baffle 72 is preferably provided. The baffle 72 is formed with a narrow aperture 72a which blocks stray light from reaching the lenses 64 and 68. In addition, a rotary shutter is provided between the baffle 72 and the lenses 64 and 68 in the form of an opaque rotary cone 73 which is formed with a plurality of openings 73a. The openings 73a are equally circumferentially spaced about the axis of the cone 73 and are provided in an odd number. In this manner, an opening 73a will align with the lens 64 whereas the opaque area between two adjacent openings 73a will align with the lens 68 and vice-versa to provide the optical switching function described with reference to the above embodiments upon rotation of the cone 73. A motor 75 rotatably drives the cone 73.

Figure 14:
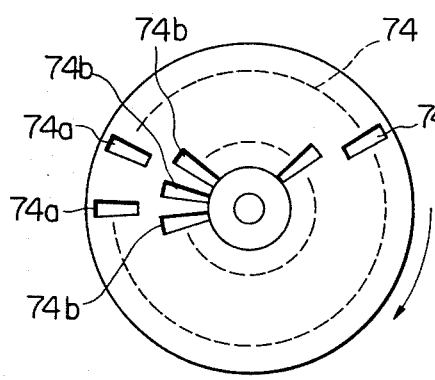
FIG. 14 is a plan view of a modified rotary shutter of the embodiment of FIG. 11.
Figure 15:
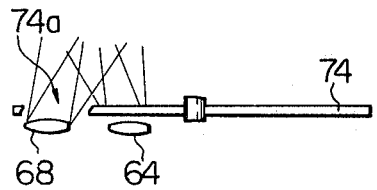
FIG. 15 is a fragmentary sectional view illustrating the operation of the rotary shutter of FIG. 14.

FIGS. 14 and 15 illustrate how a disc 74 is formed with outer openings 74a and inner openings 74b in the same manner as the disc 40 of the apparatus 31. The openings 74a are arranged to align with the lens 68 and the opening 74b are arranged to align with the lens 64 in an alternating manner upon rotation of the disc 74.

FIGS. 16 and 17 illustrate still another example of a rotary shutter for the apparatus 61. In this case a rotary disc 76 is disposed between the mirrors 65 and 69 and the array 66 and is formed with a plurality of narrow radial openings 76a. With the disc 76 rotated as indicated by an arrow 77 in FIG. 17, due to the angle at which the images 67 and 70 are incident on the array 66 the openings 76a will unblock the images 67 and 70 in sequence. The disc 76 is also suitable for use in the apparatus 51.

FIG. 18 illustrates an optical scanning apparatus 81 which is a modification of the apparatus 61. A light source 84 illuminates a scan line 83 which extends perpendicular to the plane of FIG. 18 on an original document 82. An arrow 85 indicates the direction of feed or translation of the document 82. An image of the scan line 83 is reflected by a mirror 86 to lenses 87 and 88 which converge respective halves of the image onto a photosensitive array 89 via mirrors 90 and 91 respectively. A rotary shutter 92 which is essentially identical to the cone 73 of the apparatus 61 is driven for rotation between the mirror 86 and the lenses 87 and 88 by a motor 93 via gears 94 and 95. The arrangement of the lenses 87 and 88, mirrors 90 and 91, array 89 and shutter 92 is essentially identical to that of the apparatus 61, and the operation is the same except that the image of the scan line 83 is deflected 90° by the mirror 86.

Since lenses capable of providing satisfactory image clarity for facsimile operation are expensive compared to plane mirrors, the cost of an optical scanning apparatus is further reduced if the apparatus comprises one lens rather than two. Such an apparatus is shown in FIG. 19 and designated as 101. The apparatus 101 is designed to produce electrical signals representing a scan line 103 of an original document 102 which is divided into halves 103a and 103b. A photosensitive array 106 of the type utilized in the above embodiments is arranged parallel to the scan line 103 in the plane of FIG. 19. A converging lens 104 is arranged in a plane 105 perpendicular to the plane of FIG. 19 which passes through the centers of the scan line 103 and the array 106. A first mirror 107 is disposed so as to reflect an image of the half 103b through the lens 104 to a third mirror 108 which subsequently reflects the image onto the array 106. A second mirror 109 is disposed so as to reflect an image of the half 103a through the same converging lens 104 to a fourth mirror 110 which reflects this image onto the array 106.

Figure 21:
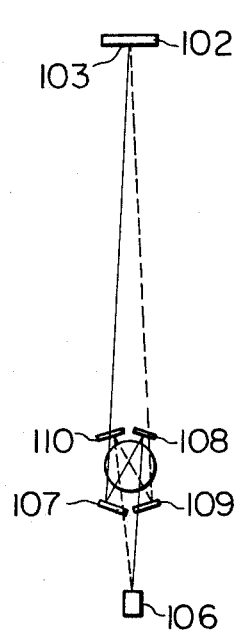
FIG. 21 is an end view of the embodiment of FIG. 19.

In this manner, a single lens 104 serves to focus the images of both of the halves 103a and 103b onto the array 106. FIG. 21 shows how the mirrors 107 to 110 are skewed relative to the plane of FIG. 19 so that the image path for the half 103b is not blocked by the mirror 110 and the image path for the half 103a is not blocked by the mirror 108. An aperture plate or baffle 111 is provided to eliminate flare where the images cross between the document 102 and the mirrors 107 and 109 a similar aperture plate or baffle 112 is provided where the images cross again at the lens 104. The baffles 111 and 112 are formed with narrow slits (not shown) in the manner of the baffle 72 of the apparatus 61.

A rotary disc 113 is provided between the mirrors 108 and 110 and the array 106 to provide optical switching of the images of the halves 103a and 103b. The disc 113 is provided with outer openings 113a which are alignable with the image of the half 103a reflected from the mirror 110 and inner openings 113b which are alignable with the image of the half 103b reflected from the mirror 108. The openings 113a and 113b are alternatingly circumferentially spaced to alternatingly unblock the images as in the above embodiments.

Figure 22:
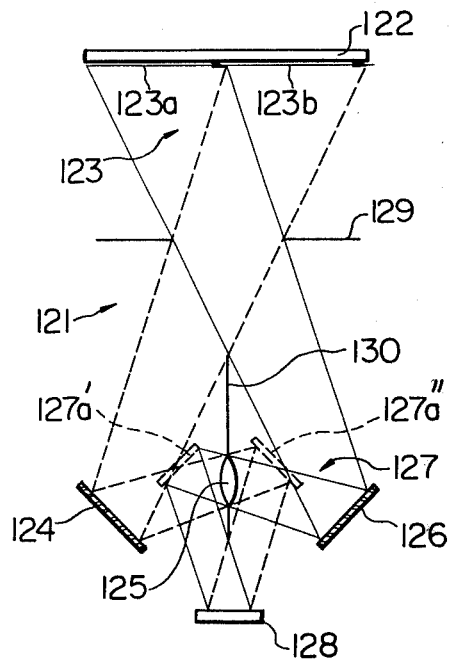
FIG. 22 is a side plan view of a modification of the embodiment of FIG. 19.
Figure 23:
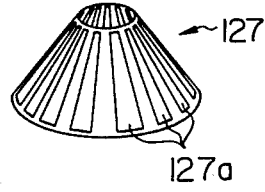
FIG. 23 is a perspective view of a rotary shutter of the modification of FIG. 22.
Figure 24:
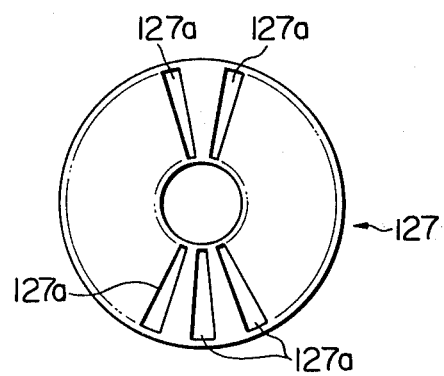
FIG. 24 is an overhead plan view of the rotary shutter shown in FIG. 23.

A unique modification of the apparatus 101 is shown in FIG. 22 and is designated as 121. A scan line 123 of an original document 122 is divided into halves 123a and 123b. A mirror 124 reflects an image of the half 123b through a converging lens 125 from left to right and a mirror 126 reflects an image of the half 123a through the converging lens 125 from right to left. A rotary cone 127 which is illustrated in FIGS. 23 and 24 is provided on the inner surface thereof with equally circumferentially spaced reflectors or mirrors 127a which may be formed by metal evaporation or the like. The cone 127 is rotatably disposed between the mirrors 124 and 126 and the document 122, and a photosensitive array 128 is disposed below the mirrors 124 and 126.

The mirrors 127a replace the mirrors 108 and 110 of the apparatus 101. Specifically, a mirror 127a occupying a position designated at 127a' receives the image of the half 123a reflected from the mirror 126 and converged by the lens 125 and reflects the same onto the array 128. A mirror 127a occupying a position designated at 127a" receives the image of the half 123b reflected from the mirror 124 and converged by the lens 125 and reflects the same onto the array 128. The spaces between the mirrors 127a may be either opaque or open. The mirrors 127a are spaced in such a manner that while one is at the position 127a' a space between adjacent mirrors 127a occupies the position 127a" and vice versa. This condition is fulfilled if the number of mirrors 127a is equal to 4N+2 where N is a positive integer. In this manner, the images of the halves 123a and 123b are alternatingly applied to the array 128, with the cone 127 serving the function of the rotary shutters of the above embodiments. A baffle 129 is provided between the document 122 and cone 127 where the images of the halves 123a and 123b cross and a similar baffle 130 is provided at the lens 125.

In summary, it will be seen that the present invention provides a substantial advance over the prior art since it enables resolution equivalent to that of prior art devices by an apparatus which is much lower in cost. If, in contrast, a photosensitive array with a packing density constituting the state of the art is substituted for the lower cost array used in any of the embodiments of the invention, the result is an apparatus with twice the resolving power of the prior art devices with only a slight increase in cost.

Although the embodiments of the invention are shown and described as dividing a scan line into two halves, the principles of the invention may of course be utilized to divide a scan line into three or more portions. Whereas the disc 39 and cone 127 are shown and described as being provided with a plurality of openings 39a and mirrors 127a respectively, only one each is required for operability of the invention.

Many other modifications will become possible for those skilled in the art after receiving the teachings of the present disclosure.

What is claimed is:
1. An optical scanning apparatus for producing a plurality of electrical signals representing a scan line of an original document, comprising:
  a photosensitive array including a plurality of photosensitive elements for producing said electrical signals respectively;
  first optical means for focussing a first image of a first half of the scan line onto the photosensitive array coextensively therewith;
  second optical means for focussing a second image of a second half of the scan line onto the photosensitive array coextensively therewith; and
  optical switching means for alternatingly blocking the first and second images.

2. An optical scanning apparatus as in claim 1, in which the optical switching means comprises an opaque rotary shutter formed with a plurality of openings therethrough arranged to alternatingly align with the first and second images to allow propagation therethrough upon rotation of the rotary shutter.

3. An optical scanning apparatus as in claim 1, in which the optical switching means comprises an opaque rotary shutter formed with a plurality of first openings and a plurality of second openings therethrough, the first openings being radially spaced from the second openings, the first openings being alignable with the first image and the second openings being alignable with the second image to allow propagation thereof therethrough upon rotation of the rotary shutter, the first and second openings being circumferentially spaced so as to alternatingly align with the first and second images.

4. An optical scanning apparatus as in claim 2, in which the openings are shaped in such a manner as to provide shading compensation.

5. An optical scanning apparatus as in claim 1, further comprising first and second mirrors to reflect the first and second images respectively.

6. An optical scanning apparatus as in claim 5, in which the first and second mirrors are operatively disposed between the first and second halves of the scan line of the original document and the first and second optical means respectively.

7. An optical scanning apparatus as in claim 5, in which the first and second mirrors are disposed between the first and second optical means and the photosensitive array respectively.

8. An optical scanning apparatus as in claim 7, in which the optical switching means comprises a rotary opaque conical member disposed between the original document and the first and second optical means, the conical member being formed with a plurality of openings therethrough arranged to alternatingly align with the first and second images to allow propagation therethrough upon rotation of the conical member.

9. An optical scanning apparatus as in claim 6, in which the first optical means comprises a converging lens and a third mirror arranged in such a manner that the first image is reflected from the first mirror, refracted by the converging lens and reflected from the third mirror onto the photosensitive array, the second optical means comprising the converging lens and a fourth mirror arranged in such a manner that the second image is reflected from the second mirror, refracted by the converging lens and reflected from the fourth mirror onto the photosensitive array.

10. An optical scanning apparatus as in claim 9, in which the third and fourth mirrors are mounted on a rotary member and arranged in such a manner that the first and second images are alternatively reflected therefrom onto the photosensitive array upon rotation of the rotary member.

* * * * *